Dec. 13, 1966   J. A. CLEMENTS ETAL   3,290,998

FLUID ACTUATOR

Filed June 8, 1964

INVENTORS
John A. Clements &
BY  Niles L. Dice

ATTORNEY

United States Patent Office 3,290,998
Patented Dec. 13, 1966

3,290,998
FLUID ACTUATOR
John A. Clements, Brownsburg, and Niles L. Dice, Indianapolis, Ind., assignors to General Motors Corporation, Detroit, Mich., a corporation of Delaware
Filed June 3, 1964, Ser. No. 373,432
23 Claims. (Cl. 91—1)

This invention relates to actuators and more particularly to fluid-operated actuators operable to selectively effect linear movement of an actuator output member between a plurality of positions.

Mechanical linkages employed in fluid, mechanical and electrical systems to selectively condition the systems for a desired effect often do not meet the required standards of accuracy especially where the linkage must follow tortuous routes. One solution is to employ a fluid control system having an actuator device responsive to fluid pressure to selectively position a control device. Movements of the actuator output member employed to impart movement to the control device must be precise which requires accurately controlled and substantially friction-free movement of the actuator output member between selected spaced points. Space accommodations may be limited and for that reason it is desirable that the actuator be compact and for economic reasons, it is desirable that the actuator be a simple structure to enable low manufacturing costs.

While actuators employing features of this invention have general utility in a large field of applications, they are especially adapted for remotely controlling selector valves in transmission control systems such as that described in copending application entitled "Manual Valve" Serial No. 303,328 filed August 20, 1963, inventor—John O. Edmunds.

The fluid-operated actuator of this invention is illustrated as being employed to selectively control the positioning of a selector valve in a transmission control system for an engine-transmission combination and includes fluid motor means having opposed pistons received in separate operating chambers and urged apart by a return spring. The linear incremental movements effected by the actuator upon the selective supply of fluid pressure to the operating chambers are bidirectional with each increment of movement in either direction being the same as determined by a selected clearance provided between the pistons when they are in their retracted positions. Movements of the pistons are imparted to an actuator output member which extends centrally through the passages and is supported in axially aligned bores in a pair of support members for substantially friction-free movement. Piston movements are imparted to the actuator output member in one embodiment by one-way friction type devices which are individually operated by the pistons and adapted to frictionally engage the actuator output member to effect incremental movement in the desired direction through the interaction of balls and ramps in response to selected piston movement. In another embodiment the actuator has one-way pawl devices operated individually by the pistons which have levered fingers pivoted by the pistons to engage with a series of spaced teeth provided on a portion of the actuator output member.

The actuator output member is connected to the selector valve and is provided with a cam which is effective in the different control positions which correspond to the drive range positions and neutral position of the selector valve to close switches connected to indicating lights to indicate the transmission conditions. In addition, the cam also opens a switch in the engine's starting circuit to prevent engine starting while the transmission is in gear.

Each increment of substantially friction-free linear movement of the actuator output member is accurately controlled by the selected clearance provided between the opposed pistons and the arrangement of parts provides a simple construction which is compact and enables low manufacturing costs.

It is an object of this invention to provide a new and improved actuator operable to selectively effect linear movement of a control member between spaced points.

It is another object of this invention to provide a fluid-operated actuator adapted for use with a transmission control system of an engine-transmission combination operable to selectively move a transmission selector valve linearly between a plurality of predetermined valve positions upon the selected supply of fluid pressure, to close switches connected to indicating lights to indicate the transmission conditions and to open a switch in the engine starting circuit to prevent engine starting while the transmission is in gear.

It is another object of this invention to provide a fluid-operated actuator including fluid motor means having opposed pistons received in separate operating chambers and urged apart by a return spring, the incremental output movement of the actuator being bidirectional with each increment of movement being the same as determined by a selected clearance provided between the pistons when they are in their retracted positions, each incremental movement being effected by the selective supply of fluid pressure to one of the operating chambers while the other operating chamber is exhaused and incremental movement of the pistons being imparted to an actuator output member which extends centrally through the pistons by one-way friction type devices which are adapted to frictionally engage the actuator control member through the interaction of balls and ramps in response to selected piston movement.

It is another object of this invention to provide a fluid-operated actuator including fluid motor means having opposed pistons received in separate operating chambers and urged apart by a return spring, the incremental output movement of the actuator being bidirectional with each increment of movement being the same as determined by a selected clearance provided between pistons when they are in their retracted positions, each incremental movement being effected by the selective supply of fluid pressure to one of the operating chambers while the other operating chamber is exhausted and incremental movement of the pistons being imparted to an actuator output member which extends centrally through the pistons by one-way pawl devices which have levered fingers adapted to engage a toothed portion of the actuator control member in response to selected piston movement.

These and other objects of the invention will be more apparent from the following description of the preferred embodiments of the invention illustrated in the drawing in which.

Figure 1:
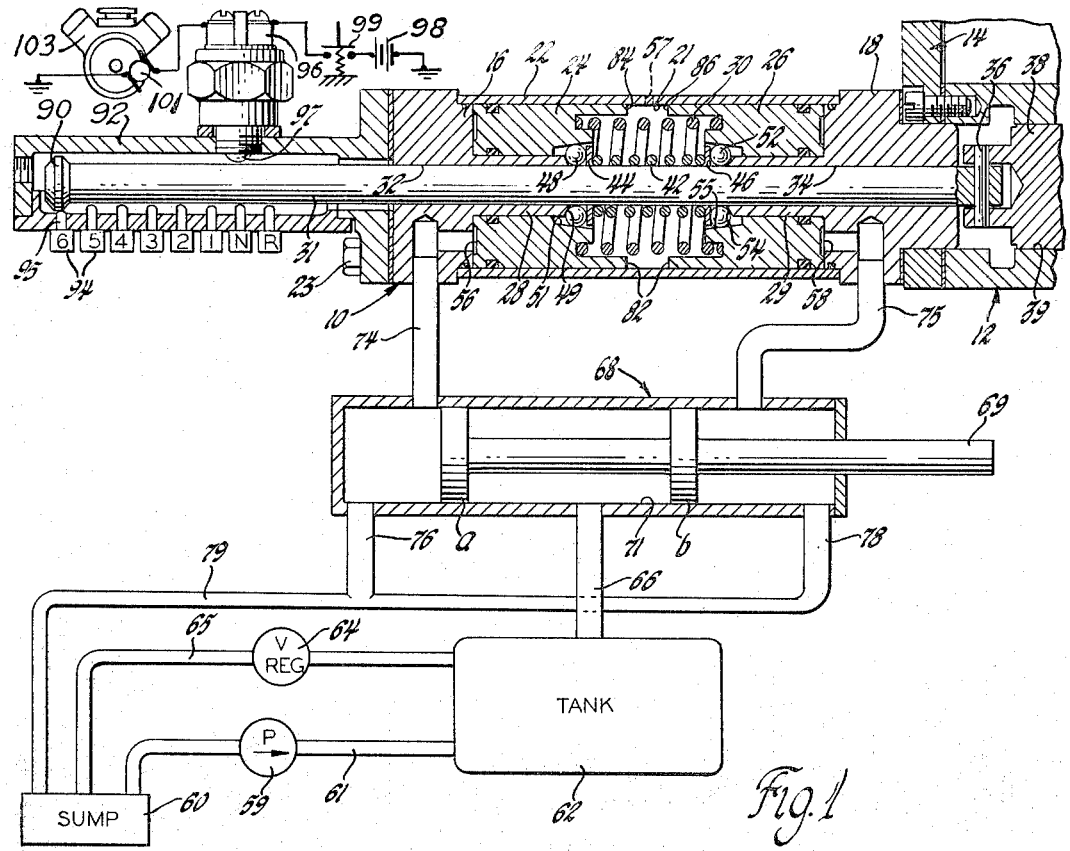
FIGURE 1 is a partial, sectional view of a fluid-operated actuator embodying features of this invention employed to control the selector valve of a transmission control system.

Referring to the drawing and particularly to FIGURE 1, the numeral 10 generally designates a fluid-operated actuator which is operable to selectively control a selector valve 12 whose assembly is securely mounted on a transmission housing 14, the selector valve 12 being a selector valve such as that shown in application Serial No. 303,328 entitled "Manual Valve."

Actuator 10 comprises a pair of motors having spaced end members 16 and 18 having at their right and left-hand ends respectively reduced diameter portions closely fitted in the left and right-hand ends of the bore 21 of a common cylinder 22. This assembly is firmly secured to transmission housing 14 by bolts 23, one of which is shown, which extend through end members 16 and 18 and are located externally of cylinder 22. A pair of opposed annular pistons 24 and 26 are received on axially extending projections 28 and 29 of end members 16 and 18 respectively and are capable of sliding movement on these projections and within the cylinder bore 21. A prestressed coil spring 30 normally urges pistons 24 and 26 apart and holds the pistons against the end members in their retracted positions as shown in FIGURE 1. Output movement of the actuator 10 is by an actuator output rod 31 which is slidably mounted in axially aligned bores 32 and 34 in end members 16 and 18 respectively and is at its right-hand end received in the closed end bore of a valve element 38 of the selector valve 12. Output rod 31 is connected by a pin 36 to the valve element 38, such valve element being located in a bore 39 of the selector valve body for reciprocal movement between a plurality of valve positions as will be explained in greater detail later.

Both motors provide motor means for piston movement in opposite directions with movement of pistons 24 and 26 being imparted to output rod 31 by one-way ball type friction devices located internally of spring 30 which include a prestressed coil spring 42 arranged between a pair of spaced rings 44 and 46, spring 42 and rings 44, 46 being received on rod 31. In the retracted positions of pistons 24 and 26 shown in FIGURE 1, spring 42 acting through ring 44 urges a plurality of circumferentially spaced balls 48 up an annular end ramp 49 provided on the end of projection 28 out of engagement with output rod 31 and into engagement with a recessed annular ramp 51 provided in the right-hand end of piston 24, the ramps 49 and 51 being oppositely inclined. In like manner and at the same time, spring 42 also acts through ring 46 to urge a plurality of circumferentially spaced balls 52 up an annular end ramp 54 provided on the end of projection 29 out of engagement with output rod 31 and into engagement with a recessed annular ramp 55 provided in the left-hand end of piston 26, the ramps 54 and 55 being oppositely inclined thus leaving output rod 31 free to move axially when the pistons are not being activated.

Movement of piston 24 is effected upon the supply of fluid pressure to its motor operating chamber 56 which exposes the left-hand annular and face of piston 24 and movement of piston 26 is effected by the supply of fluid pressure to its motor operating chamber 58 which exposes the right-hand annular end face of piston 26. The pistons 24 and 26 and the reduced diameter portions of end members 16 and 18 are provided with suitable ring seals to effectively seal the operating chambers 56 and 58 and prevent leakage and an exhaust port 57 in cylinder 22 is provided to exhaust the space between the pistons.

Fluid pressure for operating actuator 10 is supplied by pump 59 driven by the engine, not shown, which provides power input to the transmission housing 14, such pump receiving fluid from a sump 60 and delivering this fluid under pressure via a conduit 61 to a supply tank 62 in which the pressure is regulated to a predetermined pressure by a pressure regulator valve 64. Regulator valve 64 exhausts overage via a conduit 65 to sump 60 and the fluid at the regulated pressure in tank 62 is made available to a main supply conduit 66.

Fluid pressure in main supply conduit 66 is selectively delivered to operating chambers 56 and 58 by a control valve generally designated at 68 which has a manually operated spool valve element 69 having lands a and b located in a bore 71 of the valve body for reciprocal movement. Bore 71 is ported to a delivery conduit 74 connected to operating chamber 56 and also to a delivery conduit 75 connected to operating chamber 58. Bore 71 is also ported at its ends to exhaust conduits 76 and 78 which are connected to sump 60 via a main exhaust conduit 79. Lands a and b are arranged to block fluid supply to both delivery conduits 74 and 75 when the pistons are not being activated and permit the delivery conduit 74 to communicate via bore 71 with exhaust conduit 76 and the delivery conduit 75 to communicate via bore 71 with the exhaust conduit 78.

The positioning of selector valve element 38 in bore 39 determines the different transmission conditions and for that purpose such valve element must be moved linearly between a plurality of equally spaced valve positions, the selector valve element 38 being releasably held in each position by a spring loaded detent, not shown. In this instance the number of valve positions totals eight since the selector valve 12 referred to is effective to condition the transmission for six forward drive ranges, neutral and reverse. In FIGURE 1, selector valve element 38 is shown in its extreme left-hand valve position which corresponds to the sixth forward drive range with rightward movement being necessary for such valve element to assume its equally spaced valve positions corresponding to the fifth, fourth, third, second and first drive ranges, neutral and reverse in that order. The clearance designated at 82 provided between the opposed and adjacent ends 84 and 86 of pistons 24 and 26 respectively when the pistons are in their retracted positions is determined by the spacing between the selector valve positions for reasons which will become readily apparent from the description of actuator operation which follows.

Considering now the operation of the fluid-operated actuator 10, if rightward movement of the selector valve element 38 from its sixth forward drive range valve position to its fifth forward drive range valve position is desired, the output rod 31 must be moved rightwardly through a distance equal to the spacing between these valve positions. To accomplish this, the manually operated valve element 69 is moved leftwardly to a position where the main supply conduit 66 is connected between the lands a and b to the delivery conduit 74 while the other delivery conduit 75 remains connected to the exhaust conduit 78. Upon the supply of fluid pressure to operating chamber 56, the selector valve detent forces are overwhelmed and piston 24 is moved rightwardly and advances ramp 51 whereby the balls 48 are advanced and released from their engagement with the stationary ramp 49. After balls 48 leave ramp 49 they then wedge between rightwardly advancing ramp 51 and the smooth surface of output rod 31 because of the inclination of ramp 51 relative to rod 31 while at the same time prestressed spring 42 enforces this friction engagement which is effective to drive output rod 31 rightwardly conjointly with piston 24. Conjoint movement of piston 24 and output rod 31 continues until piston end 84 moves through the predetermined clearance 82 to abut with the stationary piston end 86, the clearance 82 having been determined by the spacing between valve positions with proper allowance being made for the initial piston movement necessary to effect friction engagement. Then, upon return of valve element 69 to the position shown in FIGURE 1 to exhaust operating chamber 56, the prestressed spring 30, which has been further compressed during the travel of piston 24, urges piston 24 leftwardly to return to its retracted position. This immediately releases the wedged engagement of the balls 48 to effect release of output rod 31 in its now advanced position and permits accurate positioning of selector valve element 38 in the selected valve position by the selector valve detent forces should this be necessary. Prestressed spring 42, which has also been further compressed during piston travel, upon pressure exhaust returns balls 48 to their initial positions as shown in FIGURE 1.

Thus, it will be observed that the selector valve element 38 has been moved from its sixth forward drive range valve position to its fifth forward drive range valve position and allowed to remain in the latter valve position upon reconditioning of the actuator 10 for subsequent actuator strokes. Rightward movement of selector valve element 38 to its remaining valve positions is obtained by following the procedure just described with each increment of movement being determined by the clearance 82 and the number of incremental movements being determined by the valve position desired.

Incremental movement of selector valve element 38 leftwardly from its extreme right-hand valve position, which corresponds to reverse, to the remaining valve positions is accomplished by moving manually operated valve element 69 to a position where main supply conduit 66 is connected between lands *a* and *b* to delivery conduit 75 while delivery conduit 74 remains connected to exhaust conduit 76. Upon the supply of fluid pressure to operating chamber 58, piston 26 moves leftwardly advancing ramp 55 to release balls 52 from the stationary ramp 54. Subsequently, balls 52 wedge between ramp 55 and the smooth surface of output rod 31 because of the inclination of ramp 55 relative to rod 31 while at the same time the prestressed spring 42 enforces this friction engagement to drive output rod 31 leftwardly conjointly with piston 26. Conjoint movement of piston 26 and output rod 31 then continues until piston end 86 abuts with the stationary piston end 84 to determine the limit of advancement. Then, upon return of valve element 69 to the position shown in FIGURE 1, prestressed spring 30 returns piston 26 to its retracted position and prestressed spring 42 returns balls 52 to their positions shown in FIGURE 1 leaving output rod 31 in its advanced position and actuator 10 conditioned for subsequent strokes and in either the right or left direction.

It is desirable to inform the operator of the transmission conditions and for that purpose output rod 31 at its left-hand end is provided with a cam surface 90 housed within a housing 92 which is rigidly secured to end member 16 and the assembly by the bolts 23. Microswitches 94 connected to separate indicating lights, not shown, are secured to housing 92 and have actuators 95 arranged to extend into the path of cam surface 90 so that upon movement of the output rod 31 and connected selector valve element 38 to effect conditioning of the transmission, cam surface 90 engages the actuator of that microswitch which corresponds to the selected transmission condition, to close the proper indicating light circuit to light the proper indicating light. For that purpose, microswitches 94, which are also designated by letters and numerals, namely 6, 5, 4, 3, 2, 1, N and R corresponding to the different transmission conditions, have their actuators 95 equally spaced apart and in the order shown, such actuator spacing being equal to the spacing between the selector valve positions.

In addition, it is desirous that engine starting be prevented when the transmission is in gear and for that purpose there is provided a neutral switch 96 connected in the engine starting circuit which switch is secured to housing 92 and has an actuator 97 disposed opposite the actuator of the neutral microswitch. Except for the transmission actuator actuated, engine starting enabling switch 96, the engine starting circuit is conventional and comprises the automobile battery 98 as a source of power, a starter switch 99 operated by the vehicle driver and an engine starter motor 101 for starting the engine 105 when the circuit is closed. Neutral switch 96 is closed by cam surface 90 only in neutral to complete the engine starting circuit to permit starting and remains open in all other valve positions to prevent engine starting when the transmission is in gear.

Figure 2:
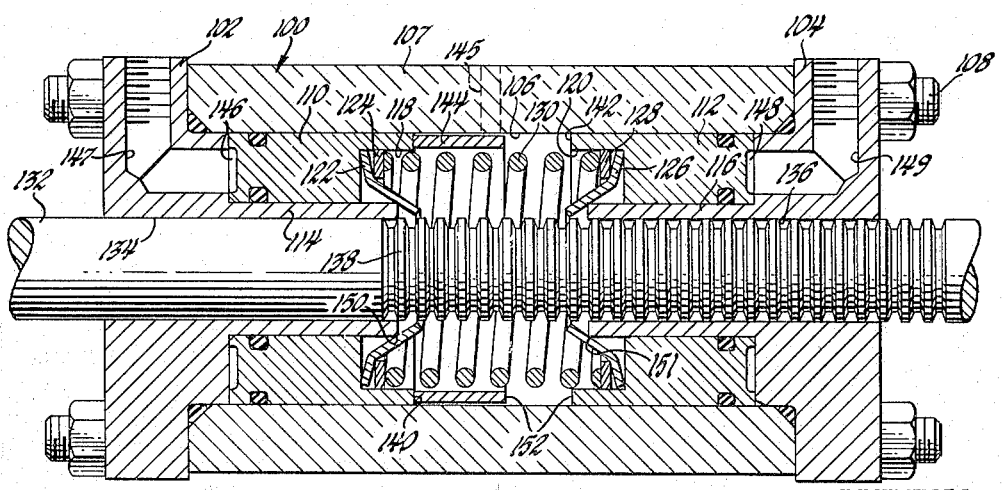
FIGURE 2 is a partial, sectional view of another fluid-operated actuator embodying features of this invention.

Referring now to FIGURE 2, there is shown a fluid-operated actuator generally designated at 100 which provides a more positive one-way pawl type of drive connection between the fluid motor pistons and output rod. Like actuator 10, this embodiment comprises a pair of motors providing motor means for bidirectional piston movement having spaced end members 102 and 104 having reduced diameter portions at their left and right-hand ends respectively which are closely fitted in bore 106 of a common cylinder 107. End members 102, 104 and cylinder 107 are rigidly secured together by bolts 108 and opposed annular pistons 110 and 112 are slidably mounted in bore 106, the pistons 110 and 112 also slidably fitting on axially extending projections 114 and 116 of end members 102 and 104 respectively.

The opposed inner faces of pistons 110 and 112 have recesses provided by counterbores 118 and 120 respectively. Mounted in counterbore 118 is a plurality of circumferentially spaced bent fingers or pawls 122 and a ring 124 which abuts with fingers 122. A plurality of circumferentially spaced bent fingers or pawls 126 and a ring 128 are likewise mounted in counterbore 120. A coil spring 130 abuts at its opposite ends with rings 124 and 128 and is prestressed and acts through the rings and fingers to urge the pistons 110 and 112 apart to their retracted positions, as shown in FIGURE 2. An actuator output rod 132 is slidably mounted in axially aligned bores 134 and 136 in end members 102 and 104 respectively and has a plurality of equally spaced teeth 138 provided along a portion thereof.

Between end 140 of piston 110 and end 142 of piston 112, there is provided a spacer sleeve 144 slidably mounted in bore 106 which acts to limit travel of the pistons as will be described below. For operating the motors, there is provided a motor operating chamber 146 exposing the left-hand end face of piston 110 supplied via a port 147 and a motor operating chamber 148 exposing the right-hand end face of piston 112 supplied via a port 149. Suitable ring seals are provided between the pistons, end members and cylinder bore to prevent leakage from the operating chambers and a port 145 in cylinder 107 is provided to exhaust the space between the pistons.

When pistons 110 and 112 are in their retracted positions, the inner ends of the fingers 122 and 126 are all retracted as shown and out of engagement with teeth 138 to permit output rod 132 to be free to move axially in the bores 134 and 136. Fingers 122 and 126 are held in their retracted positions by spring 130 which has caused the outer ends of these fingers to pivot about the stationary fulcrums or pivot points provided by edges 150 and 151 of end member projections 114 and 116 respectively and into engagement with the ends of counterbores 118 and 120.

Describing now actuator operation, upon the supply of fluid pressure to operating chamber 146 while operating chamber 148 remains exhausted such as by the fluid control system shown in FIGURE 1, the fluid pressure acting in operating chamber 146 will advance piston 110 to the right. As piston 110 initially advances, piston 110 by its engagement with the outer ends of fingers 122 causes these fingers' outer ends to pivot in the direction of piston movement and about their stationary pivot points provided by edge 150 whereby the fingers' inner ends are brought into engagement with one of the teeth 138. As piston 110 continues to move to the right, spring 130, which is being compressed during piston movement, acts through ring 124 to effect a flat surface engagement between the flat portions of fingers 122 radially outward of the bends and the end of counterbore 118 with such flat engagement being completed upon fingers 122 leaving their stationary pivot points provided by edge 150. Piston 110 continues to advance until it moves sleeve 144 to abut with the stationary piston end 142 to thus determine the limit of movement, such clearance being designated at 152 with adjustment of piston travel being obtained by employing spacer sleeves of different lengths.

On exhaust of fluid pressure in operating chamber 146, spring 130 returns piston 110 to its retracted position shown in FIGURE 2. As piston 110 is returned, the inner ends of fingers 122 move freely back across the control rod teeth 138 leaving output rod 132 in its advanced position and the fingers upon reaching their stationary pivot points provided by edge 150 pivot about such pivot points to restore their initial clearance with teeth 138 as shown in FIGURE 2. Repeated supply and exhaust of fluid pressure to operating chamber 146 will continue to advance output rod 132 rightwardly with each incremental movement being determined by clearance 152.

For incremental output rod movement to the left, fluid pressure is selectively supplied to operating chamber 148 so that piston 112 advances leftwardly and acts through fingers 126, like the piston 110 operates through fingers 122, to engage with one of the teeth 138 and advance the output rod 132 leftwardly through the distance determined by the clearance 152 with the piston 112 being returned to its retracted position by spring 130 and the fingers 126 being reconditioned for subsequent operation upon the exhaust of fluid pressure. Thus, output rod 132 can be positioned in either direction by selective supply of fluid pressure to operating chambers 146 and 148 with continued advancement being obtained by selective repeated supply of fluid pressure to these chambers, such chambers being exhausted after each fluid pressure supply.

The above-described preferred embodiments are illustrative of the invention which may be modified within the scope of the appended claims.

We claim:
1. In an actuator
   (a) a pair of fluid motors having opposed motor output members which move in opposite directions upon selective and individual motor operation and retract when motor operation is discontinued,
   (b) means operable to limit the movements of said motor output members to a predetermined stroke upon motor operation,
   (c) an actuator output member capable of movement in the direction of movement of said motor output members,
   (d) a pair of one-way devices individually operated by said motor output members each having engaging means, biasing means for retracting said motor output members and for normally holding said engaging means in a non-activated condition out of engagement with said actuator output member when said fluid motors are not being operated to permit free movement of said actuator output member,
   (e) and said engaging means each being arranged to engage their operating motor output member so that upon movement of their operating motor output member during motor operation they are conditioned from their non-activated condition to an activated condition in which they operatively engage said actuator output member and are effective to impart movement of their operating motor output member to said actuator output member and upon retraction of their operating motor output member being operable to release said actuator output member and be reconditioned in their non-activated condition.

2. The actuator set forth in claim 1 and each of said engaging means including friction elements, said biasing means comprising a prestressed spring arranged to hold said friction elements in their non-activated conditions, to permit and reinforce establishment of their activated conditions in which said friction elements frictionally engage said actuator output member and to reestablish their non-activated conditions upon retraction of their operating motor output members.

3. The actuator set forth in claim 1 and each of said engaging means including pivotal fingers, said actuator output member having equally spaced teeth arranged for engagement by said fingers, said biasing means comprising a prestressed spring arranged to hold said fingers in their non-activated conditions, to permit establishment of their activated conditions in which said fingers are caused by their operating motor output member to pivot to engage one of said spaced teeth and to reestablish their non-activated conditions upon retraction of their operating motor output members.

4. In an actuator
   (a) a pair of fluid motors having opposed motor output members which move in opposite output directions upon selective and individual motor operation and retract when motor operation is discontinued,
   (b) means effective to limit the movements of said motor output members in their output directions to a predetermined length of travel upon motor operation,
   (c) an actuator output member capable of movement in the directions of movement of said motor output members,
   (d) a pair of one-way devices individually operated by said motor output members each having actuator output engaging means, spring means holding each of said actuator output engaging means against their operating motor output members in a non-activated condition and out of engagement with said actuator output member when said fluid motors are not being operated to permit free movement of said actuator output member,
   (e) and said actuator output engaging means each being conditioned by their operating motor output member from their non-activated condition to an activated condition in which they operatively engage said actuator output member to impart movement of their operating motor output member to said actuator output member and upon retraction of their operating output member being operable to release said actuator output member and be reconditioned to their non-activated condition by said spring means.

5. In an actuator
   (a) a pair of fluid motors having opposed pistons which move in opposite output directions from retracted positions upon selective and individual motor operation and retract when motor operation is discontinued,
   (b) said pistons when in their retracted positions having a predetermined clearance therebetween whereby their output strokes are determined by said predetermined clearance upon selective and individual motor operation,
   (c) said pistons having aligned apertures, an actuator output member extending through the apertures of said pistons and being capable of movement in the directions of movement of said pistons,
   (d) a pair of one-way devices each having engaging means arranged to engage with and be individually operated by said pistons, biasing means for retracting said pistons and for normally holding said engaging means in a non-activated conditon out of engagement with said actuator output member when said fluid motors are not being operated to permit free movement of said actuator output member relative to said pistons,
   (e) and said engaging means each being arranged to engage their operating piston so that upon movement of their operating motor output member during motor operation they are conditioned from their non-activated condition to an activated condition in which they operatively engage said actuator output member and are effective to impart movement of their operating piston to said actuator output member and upon retraction of the operating piston being operable to release said actuator output member and be reconditioned in their non-activated condition.

6. In an actuator
   (a) a pair of fluid motors having opposed motor output members which move in opposite output directions from retracted positions upon selective and individual motor operation and retract when motor operation is discontinued, (b) said motor output members when in their retracted positions having a predetermined clearance therebetween whereby their output strokes are limited by said predetermined clearance upon selective and individual motor operation, (c) an actuator output member capable of movement in the directions of movement of said motor output members, (d) a pair of one-way devices individually operated by said motor output members each having actuator output engaging means, spring means for retracting said motor output members and for normally holding said actuator output engaging means in a non-activated condition and out of engagement with said actuator output member when said fluid motors are not being operated to permit free movement of said actuator output member, (e) and said actuator output engaging means each being effectively conditioned by the selective and individual movement of their operating motor output members in said output directions, from their non-activated condition to an activated condition in which they operatively engage said actuator output member to impart movement of their operating motor output member to said actuator output member and upon retraction of their operating motor output member being operable to release said actuator output member and be returned by said spring means to their non-activated condition.

7. The actuator set forth in claim 6 and each of said actuator output engaging means including friction elements, said spring means comprising a prestressed spring arranged to hold said friction elements in their non-activated conditions and against their operating motor output members, to permit establishment of their activated conditions in which said friction elements frictionally engage said actuator output member and to reestablish their non-activated conditions upon retraction of their operating motor output members.

8. The actuator set forth in claim 6 and each of said actuator output means including fingers, said actuator output member having equally spaced teeth arranged for engagement by said fingers, said spring means comprising a prestressed spring arranged to hold said fingers in their non-activated conditions, to permit establishment of their activated conditions in which said fingers are caused by their operating motor output members to pivot to positions of engagement with one of said spaced teeth and to reestablish their non-activated conditions upon retraction of their operating motor output members.

9. In an actuator
(a) support means, first and second fluid motor means supported by said support means having first and second operating chambers and first and second pistons respectively which move from retracted positions in operating directions in response to fluid pressure supply to their operating chambers, (b) said first and second pistons being arranged opposite each other so that their operating directions are opposite each other, said support means having first and second projections having first and second ends respectively, said first and second projections extending toward each other with said first and second ends being opposite and spaced from each other, said first and second pistons having apertures through which said first and second projections extend respectively so that said first and second ends project beyond said first and second pistons respectively when said first and second pistons are in their retracted positions, (c) said first and second pistons having a predetermined clearance therebetween so that when only said first piston is moved in its operating direction such movement is limited by said predetermined clearance and when only said second piston is moved in its operating direction such movement is also limited by said predetermined clearance, (d) said first and second projections having aligned apertures, an actuator output member slidably mounted in the apertures in said first and second projections, (e) a first spring arranged between said first and second pistons prestressed to normally hold said first and second pistons in their retracted positions when said first and second operating chambers are exhausted, said first spring being compressed upon movement of either of said first and second pistons when their operating chambers are solely supplied with fluid pressure so that upon exhaust of the operating chamber supplied with fluid pressure said first spring returns the operated pistons to its retracted position, (f) first and second one-way friction devices operated by said first and second fluid motor means respectively, said first and second one-way friction devices having respectively a plurality of first and second friction elements arranged about said actuator output member, first and second annular end ramps provided on said first and second ends of said first and second projections respectively and first and second annular operating ramps on said first and second pistons inclined relative to said first and second annular end ramps respectively and said actuator output member, (g) a second spring arranged between said first and second friction elements prestressed to urge said first and second friction elements against and up said first and second annular end ramps respectively out of engagement with said actuator output member and into engagement with said first and second annular operating ramps respectively when said first and second pistons are in their retracted positions, (h) and said first and second pistons upon movement from their retracted positions during sole fluid motor operation advancing said first and second operating ramps respectively whereby said first and second friction elements are advanced and released from said first and second annular end ramps respectively whereafter said first and second friction elements are wedged between and operatively frictionally connect said first and second pistons respectively to said actuator output member while at the same time said second spring is being compressed and enforces this friction connection, said actuator output member thereafter moving conjointly with the moving piston with the movement imparted to said actuator output member being determined by said predetermined clearance, said first and second pistons upon return to their retracted position immediately releasing the wedged engagement of said first and second friction elements respectively to effect release of said actuator output member in its advanced position with said second spring and said first and second annular end ramps then again cooperating to restore said first and second friction elements out of engagement with said actuator output member.

10. The actuator set forth in claim 9 and a selective fluid supply system connected to said first and second operating chambers and including control valve means and fluid under pressure, said control valve means being operable in a first condition to block the supply of said fluid under pressure to said first and second operating chambers and at the same time exhaust said first and second operating chambers, said control valve means being operable in a second condition to communicate said fluid under pressure with said first operating chamber and at the same time exhaust said second operating chamber and said control valve means being operable in a third condition to communicate said fluid under pressure with said second operating chamber and at the same time exhaust said first operating chamber.

11. In an actuator (a) support means, first and second fluid motor means supported by said support means having first and second operating chambers and first and second pistons respectively which move from retracted positions in operating directions in response to fluid pressure supplied to their operating chambers, (b) said first and second pistons being arranged opposite each other so that their operating directions are opposite each other, said support means having first and second projections having first and second ends respectively, said first and second projections extending toward each other with said first and second ends being opposite and spaced from each other, said first and second pistons having apertures through which said first and second projections extend respectively so that said first and second ends project beyond said first and second pistons respectively when said first and second pistons are in their retracted positions, (c) said first and second pistons having a predetermined clearance therebetween so that when only said first piston is moved into its operating friction direction such movement is limited by said predetermined clearance and when only said second piston is moved in its operating direction such movement is also limited by said predetermined clearance, (d) said first and second projections having aligned apertures, an actuator output member slidably mounted in the apertures in said first and second projections having equally spaced teeth, (e) a spring arranged between said first and second pistons prestressed to normally hold said first and second pistons in their retracted positions when said first and second operating chambers are exhausted, said spring being compressed upon movement of either of said first and second pistons when their operating chambers are supplied with fluid pressure so that upon exhaust of the operating chamber supplied with fluid pressure said spring returns the operated piston to its retracted position, (f) first and second one-way engaging devices operated by said first and second fluid motor means respectively, said first and second one-way engaging devices having a plurality of first and second bent fingers respectively arranged about said actuator output member with each bent finger having an inner end adjacent said spaced teeth of said actuator output member, an outer end and a flat portion near said outer end, said first and second ends of said first and second projections providing first and second stationary pivot points for said first and second bent fingers respectively, (g) said spring also being arranged between the flat portions of said first and second bent fingers so as to pivot said first and second bent fingers about said first and second stationary pivot points to bring the outer ends of said first and second bent fingers into engagement with said first and second pistons respectively and to bring the inner ends of said first and second bent fingers out of engagement with said spaced teeth of said actuator output member when said first and second pistons are in their retracted positions, (h) and said first and second pistons upon movement from their retracted positons during sole fluid motor operation being effective to pivot said first and second bent fingers about said first and second stationary pivot points respectively to bring the inner ends of said first and second bent fingers into engagement with one of said first spaced teeth of said actuator output member with continuing movement of said first and second pistons enabling said spring to effect a flat engagement between said flat portions of said first and second bent fingers and said first and second pistons respectively upon said first and second bent fingers leaving said first and second stationary pivot points respectively so that said spring firmly holds said first and second bent fingers against said first and second pistons respectively to prevent their further pivoting while in engagement with said one of said spaced teeth, said actuator output member thereafter moving conjointly with the moving piston with the movement imparted to said actuator output member being determined by said predetermined clearance, the inner ends of said first and second bent fingers upon return of said first and second pistons respectively to their retracted positions riding up out of and back across said spaced teeth to effect release of said actuator output member in its advanced position with said spring and said first and second stationary pivot points again cooperating to restore the inner ends of said first and second bent fingers out of engagement with said spaced teeth when said first and second pistons are in their retracted positions.

12. The actuator set forth in claim 11 and a selective fluid supply system connected to said first and second operating chambers including control valve means and fluid under pressure, said control valve means being operable in a first condition to block the supply of said fluid under pressure to said first and second operating chambers and at the same time exhaust said first and second operating chambers, said control valve means being operable in a second condition to communicate said fluid under pressure with said first operating chamber while maintaining said second operating chamber exhausted and said control valve means being operable in a third condition to communicate said fluid under pressure with said second operating chamber while maintaining said first operating chamber exhausted.

13. In combination with a transmission selector valve having a selector valve element which is movable between a plurality of equally spaced valve positions, (a) an actuator comprising a pair of fluid motors having opposed motor output members which move in opposite directions upon selective and individual motor operation and retract when motor operation is discontinued, (b) means operable to limit the movements of said motor output members to a predetermined stroke substantially equal to the spacing between said valve positions upon motor operation, (c) an actuator output member operatively connected to said selector valve capable of movement in the directions of movement of said motor output members, (d) a pair of one-way devices individually operated by said motor output members each having engaging means for retracting said motor output members and for normally holding said engaging means in a non-activated condition out of engagement with said actuator output member when said fluid motors are not being operated to permit free movement of said actuator output member, (e) and said engaging means each being arranged to engage their operating motor output member so that upon movement of their operating motor output member during motor operation they are conditioned from their non-activated condition to an activated condition in which they operatively engage said actuator output member and are effective to impart movement of their operating motor output member to said actuator output member and connected selector valve element whereby said selector valve element is caused to move between adjacent valve positions to said actuator output member and connected selector valve element and upon retraction of their operating motor output member being operable to release said actuator output member to leave said selector valve in the valve position to which it has been moved and be reconditioned in their non-activated condition.

14. The combination set forth in claim 13 and said plurality of valve positions including a transmission conditioning neutral valve position and a plurality of transmission conditioning drive valve positions, a cam surface conjointly movable with said actuator output member, an indicating light switch for each said valve position, said indicating light switches being arranged so that said cam surface operatively engages and operates the indicating light switch corresponding to the valve position selected, and an engine starting enabling switch arranged so that said cam surface operatively engages and operates said engine starting enabling switch to permit engine starting only when said selector valve is in said neutral valve position.

15. In combination with a transmission selector valve having a selector valve element which is movable between a plurality of equally spaced valve positions,
 (a) an actuator comprising support means, first and second fluid motor means supported by said support means having first and second operating chambers and first and second pistons respectively which move from retracted positions in operating directions in response to fluid pressure supplied to their operating chambers,
 (b) said first and second pistons being arranged opposite each other so that their operating directions are opposite each other, said support means having first and second projections having first and second ends respectively, said first and second projections extending toward each other with said first and second ends being opposite and spaced from each other, said first and second pistons having apertures through which said first and second projections extend, respectively so that said first and second ends project beyond said first and second pistons respectively when said first and second pistons are in their retracted positions,
 (c) said first and second pistons having a predetermined clearance therebetween substantially equal to the spacing between said valve positions so that when only said first piston is moved into its operating direction such movement is limited by said predetermined clearance when only said second piston is moved in its operating direction such movement is also limited by said predetermined clearance,
 (d) said first and second projections having aligned apertures, an actuator output member slidably mounted in the apertures in said first and second projections having equally spaced teeth and being operatively connected to said selector valve element,
 (e) a spring arranged between said first and second pistons prestressed to normally hold said first and second pistons in their retracted positions when said first and second operating chambers are exhausted, said spring being compressed upon movement of either of said first and second pistons when their operating chambers are supplied with fluid pressure so that upon exhaust of the operating chamber supplied with fluid pressure said spring returns the operated piston to its retracted position,
 (f) first and second one-way engaging devices operated by said first and second fluid motor means respectively, said first and second one-way engaging devices having a plurality of first and second bent fingers respectively arranged about said actuator output member with each bent finger having an inner end adjacent said spaced teeth of said actuator output member, an outer end and a flat portion near said outer end, said first and second ends of said first and second projections providing first and second stationary pivot points for said first and second bent fingers respectively,
 (g) said spring also being arranged between the flat portions of said first and second bent fingers so as to pivot said first and second bent fingers about said first and second stationary pivot points to bring the outer ends of said first and second bent fingers into engagement with said first and second pistons respectively and to bring the inner ends of said first and second bent fingers out of engagement with said spaced teeth of said actuator output member when said first and second pistons are in their retracted positions,
 (h) and said first and second pistons upon movement from their retracted positions during sole fluid motor operation being effective to pivot said first and second bent fingers about said first and second stationary pivot points respectively to bring the inner ends of said first and second bent fingers into engagement with one of said first spaced teeth of said actuator output member with continuing movement of said first and second pistons enabling said spring to effect a flat engagement between said flat portions of said first and second bent fingers and said first and second pistons respectively upon said first and second bent fingers leaving said first and second stationary pivot points respectively so that said spring firmly holds said first and second bent fingers against said first and second pistons respectively to prevent their further pivoting while in engagement with said one of said spaced teeth, said actuator output member thereafter moving conjointly with the moving piston with the movement imparted to said actuator output member and connected selector valve element being determined by said predetermined clearance and equal to the spacing between said valve positions whereby said selector valve element is caused to move between adjacent valve positions, the inner ends of said first and second bent fingers upon return of said first and second pistons respectively to their retracted positions riding up out of and back across said spaced teeth to effect release of said actuator output member in its advanced position with said spring and said first and second stationary pivot points again cooperating to restore the inner ends of said first and second bent fingers out of engagement with said spaced teeth when said first and second pistons are in their retracted positions.

16. The combination set forth in claim 15 and said plurality of valve positions including a transmission conditioning neutral valve position and a plurality of transmission conditioning drive valve positions, a cam surface conjointly movable with said actuator output member, an indicating light switch for each said valve position, said indicating light switches being arranged so that said cam surface operatvely engages and operates the indicating light switch corresponding to the valve position selected, and an engine starting enabling switch arranged so that said cam surface operatively engages and operates said engine starting enabling switch to permit engine starting only when said selector valve is in said neutral valve position.

17. The combination set forth in claim 15 and a selective fluid supply system connected to said first and second operating chambers including control valve means and fluid under pressure, said control valve means being operable in a first condition to block the supply of said fluid under pressure to said first and second operating chambers and at the same time exhaust said first and second operating chambers, said control valve means being operable in a second condition to communicate said fluid under pressure with said first operating chamber while maintaining said second operating chamber exhausted and said control valve means being operable in a third condition to communicate said fluid under pressure with said second operating chamber while maintaining said first operating chamber exhausted.

18. In combination with a transmission selector valve having a selector valve element which is movable between a plurality of equally spaced valve positions,
  (a) an actuator comprising support means, first and second fluid motor means supported by said support means having first and second operating chambers and first and second pistons respectively which move from retracted positions in operating directions in response to fluid pressure supply to their operating chambers,
  (b) said first and second pistons being arranged opposite each other so that their operating directions are opposite each other, said support means having first and second projections having first and second ends respectively, said first and second projections extending toward each other with said first and second ends being opposite and spaced from each other, said first and second pistons having apertures through which said first and scond projections extend respectively so that said first and second ends project beyond said first and second pistons respectively when said first and second pistons are in their retracted positions,
  (c) said first and second pistons having a predetermined clearance therebetween substantially equal to the spacing between said valve positions so that when only said first piston is moved in its operating direction such movement is limited by said predetermined clearance and when only said second piston is moved in its operating direction such movement is also limited by said predetermined clearance.
  (d) said first and second projections having aligned apertures, an actuator output member slidably mounted in the apertures in said first and second projections and operatively connected to said selector valve element,
  (e) a first spring arranged between said first and second pistons prestressed to normally hold said first and second pistons in their retracted positions when said first and second operating chambers are exhausted, said first spring being compressed upon movement of either of said first and second pistons when their operating chambers are supplied with fluid pressure so that upon exhaust of the operating chamber supplied with fluid pressure said first spring returns the operated piston to its retracted position,
  (f) first and second one-way friction devices operated by said first and second fluid motor means respectively, said first and second one-way friction devices having respectively a plurality of first and second friction elements arranged about said actuator output member, first and second annular end ramps provided on said first and second ends of said first and second projections respectively and first and second annular operating ramps on said first and second pistons inclined relative to said first and second annular end ramps respectively and said actuator output member,
  (g) and a second spring arranged between said first and second friction elements prestressed to urge said first and second friction elements against and up said first and second annular end ramps respectively out of engagement with said actuator output member and into engagement with said first and second annular operating ramps respectively when said first and second pistons are in their retracted positions, and said first and second pistons upon movement from their retracted positions during sole fluid motor operation advancing said first and second operating ramps respectively whereby said first and second friction elements are advanced and released from said first and second annular end ramps respectively whereafter said first and second friction elements are wedged between and operatively frictionally connect said first and second pistons respectively to said actuator output member while at the same time said second spring is being compressed and enforces this friction connection, said actuator output member thereafter moving conjointly with the moving piston with the movement imparted to said actuator output member and connected selector valve element being determined by said predetermined clearance and equal to the spacing between said valve positions whereby said selector valve element is caused to move between adjacent valve positions, said first and second pistons upon return to their retracted positions immediately releasing the wedge engagement of said first and second friction elements respectively to effect release of said actuator output member in its advanced position to leave said selector valve element in the valve position to which it has been moved with said second spring and said first and second annular end ramps then again cooperating to restore said first and second friction elements out of engagement with said actuator output member.

19. The combination set forth in claim 18 and said plurality of valve positions including a transmission conditioning neutral valve position and a plurality of transmission conditioning drive valve positions, a cam surface conjointly movable with said actuator output member, an indicating light switch for each said valve position, said indicating light switches being arranged so that said cam surface operatively engages and operates the indicating light switch corresponding to the valve position selected, and an engine starting enabling switch arranged so that said cam surface operatively engages and operates said engine starting enabling switch to permit engine starting only when said selector valve is in said neutral valve position.

20. The combination set forth in claim 18 and a selective fluid supply system connected to said first and second operating chambers and including control valve means and fluid under pressure, said control valve means being operable in a first condition to block the supply of said fluid under pressure to said first and second operating chambers and at the same time exhaust said first and second operating chambers, said control valve means being operable in a second condition to communicate said fluid under pressure with said first operating chamber and at the same time exhaust said second operating chamber and said control valve means being operable in a third condition to communicate said fluid under pressure with said second operating chamber and at the same time exhaust said first operating chamber.

21. In an actuator
  (a) fluid motor means having motor output means operable to move in opposite directions upon selectively controlled motor operation and retract when motor operation is discontinued,
  (b) means operable to limit the movements of said motor output means to a predetermined stroke upon motor operation,
  (c) an actuator output member capable of movement in the directions of movement of said motor output means,
  (d) a pair of one-way devices operated by said motor output means each having engaging means, biasing means for retracting said motor output means and for normally holding said engaging means in a non-activated condition out of engagement with said actuator output member when said fluid motor means is not being operated to permit free movement of said actuator output member,
  (e) and said engaging means each being arranged to engage said motor output means so that upon selective movement of said motor output means said engaging means are selectively and individually conditioned from their non-activated condition to an activated condition in which they operatively engage said actuator output member and are effective to impart the selective movements of said motor output means to said actuator output member and upon retraction of said motor output means being operable to release said actuator output member and be reconditioned in their non-activated condition.

22. The actuator set forth in claim 21 and each of said engaging means including friction elements, said biasing means comprising a prestressed spring arranged to hold said friction elements in their non-activated conditions, to permit and reinforce establishment of their activated conditions in which said friction elements frictionally engage said actuator output member and to reestablish their non-activated conditions upon retraction of their operating motor output members.

23. The actuator set forth in claim 21 and each of said engaging means including pivotal fingers, said actuator output member having equally spaced teeth arranged for engagement by said fingers, said biasing means comprising a prestressed spring arranged to hold said fingers in their non-activated conditions, to permit establishment of their activated conditions in which said fingers are caused by said motor output means to pivot to engage one of said spaced teeth and to reestablish their non-activated conditions upon retraction of said motor output means.

References Cited by the Examiner

UNITED STATES PATENTS

| | | | |
|---|---|---|---|
| 2,348,764 | 5/1944 | Thomas | 92—75 |
| 2,531,907 | 11/1950 | Daubenmeyer | 92—29 |
| 3,141,381 | 7/1964 | MacDonald | 92—5 |
| 3,188,916 | 6/1965 | Beatty | 91—172 |

MARTIN P. SCHWADRON, *Primary Examiner.*

PAUL E. MASLOUSKY, *Examiner.*

UNITED STATES PATENT OFFICE
CERTIFICATE OF CORRECTION

Patent No. 3,290,998                  December 13, 1966

John A. Clements et al.

It is hereby certified that error appears in the above numbered patent requiring correction and that the said Letters Patent should read as corrected below.

Column 2, line 30, for "exhaused" read -- exhausted --; column 3, line 47, for "and", first occurrence, read -- end -- column 8, line 67, for "the" read -- their --; column 13, line 45, after "clearance" insert -- and --; column 14, line 53, for "operatvely" read -- operatively --; column 15, line 18, for "scond" read -- second --.

Signed and sealed this 26th day of September 1967.

(SEAL)
Attest:

ERNEST W. SWIDER                  EDWARD J. BRENNER
Attesting Officer                      Commissioner of Patents